(12) United States Patent
Marcus et al.

(10) Patent No.: US 6,614,534 B1
(45) Date of Patent: Sep. 2, 2003

(54) METHOD AND APPARATUS FOR COMBINED MEASUREMENT OF SURFACE NON-UNIFORMITY INDEX OF REFRACTION VARIATION AND THICKNESS VARIATION

(75) Inventors: Michael A. Marcus, Honeoye Falls, NY (US); Jiann-Rong Lee, Webster, NY (US); Donald A. Stephenson, Rochester, NY (US); Thomas F. Kaltenbach, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/460,280

(22) Filed: Dec. 14, 1999

(51) Int. Cl.⁷ .............................................. G01B 11/02
(52) U.S. Cl. ...................................... 356/503; 356/497
(58) Field of Search ................................ 356/503, 497, 356/511, 517

(56) References Cited

U.S. PATENT DOCUMENTS

| | | |
|---|---|---|
| 3,319,515 A | 5/1967 | Flournoy |
| 4,955,719 A | 9/1990 | Hayes |
| 5,446,547 A | 8/1995 | Guenther et al. |
| 5,596,409 A | 1/1997 | Marcus et al. |
| 5,633,712 A * | 5/1997 | Venkatesh et al. .......... 356/503 |
| 5,850,287 A * | 12/1998 | Sorin et al. ................. 356/503 |

* cited by examiner

Primary Examiner—Frank G. Font
Assistant Examiner—Philip Natividad
(74) Attorney, Agent, or Firm—Thomas H. Close (57) ABSTRACT

A method of simultaneously measuring the thickness, group index of refraction, and top and bottom surface profiles of a sample, includes the steps of locating the sample between a surface of a transparent optical flat and a parallel reflective surface such that the respective optical distances between any two of the surface of the optical flat, the top surface of the sample, the bottom surface of the sample, and the reflective surface are distinct and in a known relative optical distance relationship, the distance between the surface of the transparent optical flat and the parallel reflective surface being known. A low-coherent light interferometer operating in an autocorrelation configuration is employed to measure the distance between the optical flat surface and the top surface of the sample, the optical thickness of the sample, and the distance between the bottom surface of the sample and the reflective surface at a plurality of locations over the sample, employing the known relative optical distance relationships. Top and bottom surface profiles and a thickness profile of the sample are generated from the measured distances and the known distance between the surface of the transparent optical flat and the parallel reflective surface. An group index of refraction profile is generated from the measured optical thickness and bottom surface profiles.

10 Claims, 6 Drawing Sheets

METHOD AND APPARATUS FOR COMBINED MEASUREMENT OF SURFACE NON-UNIFORMITY INDEX OF REFRACTION VARIATION AND THICKNESS VARIATION

FIELD OF THE INVENTION

The present invention relates to optical reflectometry, and more particularly, to a method and apparatus for measuring the thickness, group index of refraction, and front and back surface profiles of a sample of material such as a film, web or sheet.

BACKGROUND OF THE INVENTION

In many industrial processes, control and understanding of film thickness, group index of refraction and surface profiles is of critical importance. For example, the manufacture of photographic film requires the generation of a uniform base or backing for the film that is free from surface defects and thickness variations. From the point of view of process control, it is advantageous to be able to measure the film base thickness surface, and group index of refraction profiles during the film generation process rather than measuring the film base in a laboratory after the film base has been manufactured. If samples are measured off-line, correction of any machinery malfunction cannot be performed until after a considerable volume of defective material has been processed. This leads to waste. For the purposes of the present discussion, the term sample includes films, sheets webs, and other material shapes that are generally flat.

Methods for simultaneously measuring the thickness and group index of refraction of films using low coherent light interferometry in an autocorrelation configuration are known to prior art. For the purposes of this discussion, an interferometer operating in an autocorrelation configuration is defined to be an interferometer having a variable differential time delay. One embodiment of an optical autocorrelator is described, for example, in chapter 5 of Statistical Optics, by Joseph W. Goodman (John Wiley & Sons, 1985, pp. 157–170). Those skilled in the art are aware of the principles of operation of an optical autocorrelator, but certain principles will be clarified here because of their relevance to this patent. In an autocorrelating interferometer wherein light is split into two different paths and then recombined and directed to a photodiode, the detected light intensity is measured as a function of a parameter. This parameter can be the differential optical path length $\Delta L$ of the interferometer or it can be the differential time delay $\Delta t$ of the interferometer. These parameters are related by $\Delta L = nc\Delta t$, where c is the speed of light in vacuum and n is the group index of the medium (usually air) of the differential optical path. The detected light intensity expressed as a function of the differential time delay is called the coherence function of the input light. Hence, a receiver which determines the time delay between light reflected from different surfaces of a film performs the same function as a receiver which determines the path delay between light reflected from different surfaces of a film. Determining the spacing between peaks in the coherence function of the reflected light is yet another way to describe the same function. For the purposes of the present discussion, the term differential time delay shall include differential path delay.

A Michelson interferometer is an example of such an interferometer operating in an autocorrelation configuration. An example of an apparatus for measuring film thickness which utilizes a Michelson interferometer is taught in U.S. Pat. No. 3,319,515 to Flournoy. In this system, the film is illuminated with a collimated light beam at an angle with respect to the surface of the film. The front and back surfaces of the film generate reflected light signals. The distance between the two reflecting surfaces is then determined by examining the peaks in the autocorrelation spectrum generated in a Michelson interferometer that receives the reflected light as its input.

U.S. Pat. No. 5,633,712 issued May 27, 1997 to Venkatesh et al., entitled "Method and Apparatus for Determining the Thickness and Index of Refraction of a Film Using Low Coherence Reflectometry and a Reference Surfaces," discloses a method and apparatus for simultaneously determining the thickness and group index of refraction of a film using low-coherence reflectometry in an autocorrelation configuration. The apparatus includes a low coherence light source that generates a probe light signal. The film is positioned between first and second reference reflectors, the first reference reflector being partially reflecting. The probe light signal is applied to the film after passing through the first reference reflector. The portion of the probe light signal leaving the film is reflected back toward the first reference reflector by the second reference reflector. The light exiting through the first reference reflector is collected to form the input to a receiver that determines the time delay between light reflected from the top and bottom surfaces of the film as well as the change in optical path length between said first and second reflectors resulting from the introduction of said film between said first and second reflectors.

The prior art methods for measuring the surface profile of a sample include the use of a profilometer, which employs a probe to physically contact the surface of the sample and generate a surface profile. Non-contact methods of surface profile measurement include optical phase shifting interferometers as described in U.S. Pat. No. 4,955,719 issued Sep. 11, 1990 to Hayes and vertical scanning interference microscopy as described in U.S. Pat. No. 5,446,547 issued Aug. 29, 1995 to Guenther et al. These traditional non-contact methods require turning the sample over and engaging in edge and corner alignment in an attempt to measure the top and bottom surface profiles of corresponding locations.

Broadly, it is the object of the present invention to provide an improved apparatus and method for simultaneously measuring the thickness, group index of refraction, and surface profiles of a sample of material such as a thin film.

It is a further object of the present invention to provide a system that does not require contact between the film and the measuring device.

These and other objects of the present invention will become apparent to those skilled in the art from the following detailed description of the invention and the accompanying drawings.

SUMMARY OF THE INVENTION

A method of simultaneously measuring the thickness, group index of refraction, and top and bottom surface profiles of a sample, includes the steps of locating the sample between a surface of a transparent optical flat and a parallel reflective surface such that the respective optical distances between any two of the surface of the optical flat, the top surface of the sample, the bottom surface of the sample, and the reflective surface are distinct and in a known relative optical distance relationship, the distance between the surface of the transparent optical flat and the parallel reflective surface being known. A low-coherent light interferometer preferably operating in an autocorrelation configuration is employed to measure the distance between the optical flat surface and the top surface of the sample, the optical thickness of the sample, and the distance between the bottom surface of the sample and the reflective surface at a plurality of locations over the sample, employing the known relative optical distance relationships. Top and bottom surface profiles and a thickness profile of the sample are generated from the measured distances and the known distance between the surface of the transparent optical flat and the parallel reflective surface. A group index of refraction profile is generated from the measured optical thickness and generated thickness profile.

One advantage of this invention is the ability to measure top surface profilometry, bottom surface profilometry, thickness profiles and group index of refraction profiles of a sample during a single set of measurements using a single non-contact probe. Both free and clamped web or film materials can be measured.

Another advantage of this invention is that it can be applied to measure birefringent materials in which case it can measure top surface profilometry, bottom surface profilometry, thickness profiles, major and minor axes group index of refraction profiles, birefringence profiles and optical retardation profiles of a sample during a single set of measurements using a single non-contact probe.

Another advantage is that the invention can be utilized as an on-line thickness, surface and group index refraction profiler of web materials during production.

DETAILED DESCRIPTION OF THE INVENTION

Figure 1:
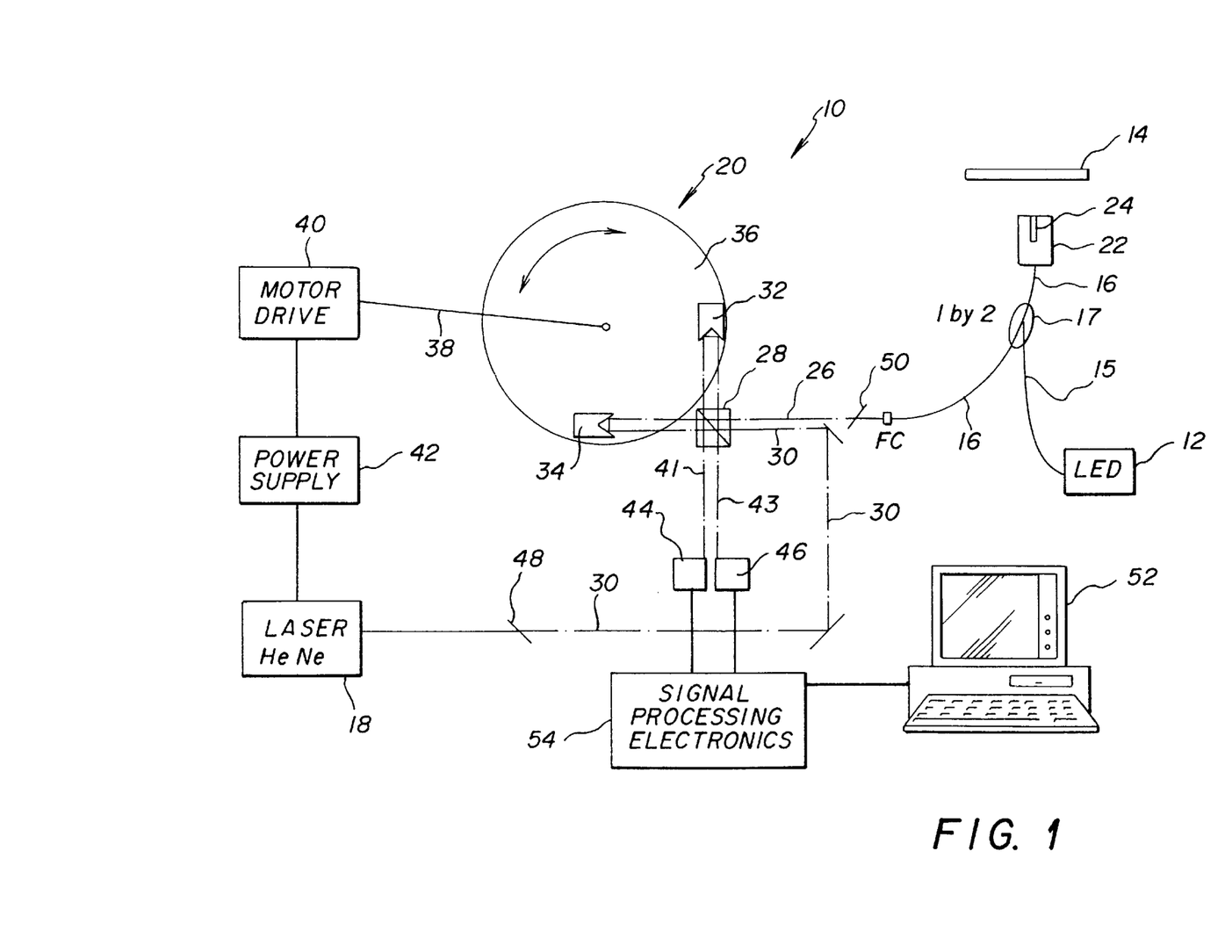
FIG. 1 is a schematic diagram of an interferometer useful with the present invention operating in an autocorrelation mode.

Referring now to FIG. 1 a schematic diagram of apparatus including a low-coherent light interferometer employed in the practice of the present invention is shown. The apparatus, generally designated 10 includes a first rotating head dual Michelson interferometer (or other optical autocorrelator or interferometer having a variable differential time delay) set up in an optical autocorrelation configuration mode. Low coherence light from a 1300 nm broadband light emitting diode (LED) 12 is directed to a measurement cell 14 by a fiber optic light guide 15 through a 2 by 1 coupler 17 into fiber optic light guide 16. Light reflected from the measurement cell 14 is introduced into both arms of the interferometer 10 by fiber optic light guide 16.

Coherent light generated by a laser 18 shares some of the same elements as the first interferometer and is utilized to track the distance that the optical path of the first interferometer changes as the optical head 20 rotates to change the lengths of the arms of the interferometer.

Light from the low-coherent light source 12 is focused onto the measurement cell 14 through an optical focusing probe 22 which includes a Gradient Index lens (GRIN) 24. Some light is reflected off each optical surface in the measurement cell 14 and is returned to the interferometer 10. All of these reflected light signals pass back through the optical focusing probe 22, are sent back down the same optical fiber 16 and pass through the 2 by 1 optical coupler 17 staying in optical fiber 16. These signals are introduced into the rotating head interferometer as the top beam 26 on the right side of a beam splitter cube 28. The interferometer is set up in a bulk Michelson configuration. Solid lines in FIG. 1 indicate the light paths. There is also a second light path for a reference beam (bottom beam) 30 (preferably generated by a helium neon laser 18, having a wavelength $\lambda=632.991\pm0.0005$ nm), which arrives at the beam splitter cube 28 as the bottom beam 30 on the right side. A pair of hollow-cube retroreflectors 32 and 34 are mounted 90° apart on a rotatable platform 36, preferably having a diameter of about 87 mm. The beam splitter cube 28 divides the laser and LED beams into pairs of light beams directed toward the hollow retroreflectors 32 and 34. The hollow retroreflectors 32 and 34 are pre-aligned to form the two reflective arms of the Michelson interferometer with respect to the beam splitter cube 28. Rotating a shaft 38 connected to the platform 36 causes the path length of one arm to increase while the path length of the other arm decreases by the same amount. A brushless DC motor drive 40 attached to the shaft 38 of the platform produces the rotation. Power supplies 42 provide power to the motor drive 40 the laser 18 and the other elements of the apparatus.

The output beams 41 and 43 of the interferometer 10 are applied to a pair of detectors 44 and 46, one 44 for the laser light and one 46 for the low-coherent light beam. A first notch filter 50 is used to block the light from the laser 18 from being incident on the measurement cell 14. A second notch filter 48 is used to prevent light from LED 12, reflected from the measurement cell 14, from entering the laser cavity of laser 18.

During operation, the rotating head motor drive 40 is cycled to alternately increase and decrease the optical path difference in the interferometer. Light signals from both the laser 18 and the low coherence LED light source 12 traverse the same optical path length in the interferometer arms, but in reverse order as they travel to and from the pair of retroreflectors 32 and 34. The beam from the HeNe laser 18 enters the beam splitter 28 from the lower right side and is split into two beams at the lower right intersection point, which travel to the left and up respectively as shown in FIG. 1. The laser beam traveling to the left from the beam splitter goes to the horizontal retroreflector 34, entering from the bottom right and arriving back at the beam splitter 28 on the top left. The laser beam traveling to the top retroreflector 32 arrives on the right side and returns to the beam splitter 28 on the top left side where the two laser beams are recombined. The recombined laser beams interfere with each other, and are split into two beams at the beam splitter 28. One beam goes to the laser detector 44 and the other one travels to the right. The recombined laser beam traveling to the right from the top left intersection point is blocked by the laser notch filter 50 thereby preventing laser light from illuminating the measurement cell 14.

As the motor drive 40 rotates, the optical path lengths of the two arms of the interferometer change simultaneously, and interference fringes occur every half wavelength of optical path difference. A similar analysis for the light coming from the sample shows that it follows the same optical path, but in reverse order.

The stabilized HeNe laser interferometer is utilized to track the distance the optical path has changed during rotation of the optical head 20. The laser signal is utilized to provide data acquisition trigger signals, at constant distance intervals, for collecting interferometric data from the low-coherent light interferometer. Thus, the purpose of the laser interferometer is to track the distance the rotating optical head moves while the low-coherent light interferometer is collecting data from the sample.

For the low-coherent light source 12, constructive interference occurs when the path lengths of the two arms in the interferometer are equal within a few coherence lengths. In order for constructive interference to occur, light must be reflected back into the interferometer from the measurement cell 14. This will occur at each optical interface in the measurement cell. The distance between adjacent interference peaks represents the optical thickness (group index of refraction (n) times physical thickness) of materials, including air, in the measurement cell. In air layers, the distance between the two adjacent surfaces is the thickness of the layer. Since the instrument uses a stabilized laser light source for providing constant distance interval measurements, the instrument measures absolute optical path distance defined as (n) times thickness. The measurement configuration of the interferometer is the optical auto-correlation mode, in which light reflecting from the measurement cell 14 is input to both arms of the Michelson interferometer. In the autocorrelation mode, light reflecting from the measurement cell 14 is made to interfere with itself, and both arms of the interferometer see reflections from all of the optical interfaces in the measurement cell 14. As the path lengths of the two arms of the interferometer are changed, a series of interference peaks are observed, indicating the optical path differences between adjacent optical interfaces. The self-correlation condition occurs when the two path lengths of the Michelson interferometer are equal, in which case, all optical interfaces in the sample interfere constructively. The measured distance between the largest peak, at zero path length difference, and the first set of adjacent peaks is the shortest optical path difference in the measurement cell.

Data acquisition and analysis is performed utilizing a computer 52, such as a Pentium computer containing National Instrument data acquisition cards. The periodicity of the laser light is utilized to track distance that the low-coherent light interferometer moves. Signal Processing electronics 54 and data analysis routines running under Lab Windows CVI program development environment (available from National Instruments) running on computer 52 are provided to analyze low-coherent light interferograms resulting from reflections at optical interfaces in the measurement cell 14.

Figure 4:
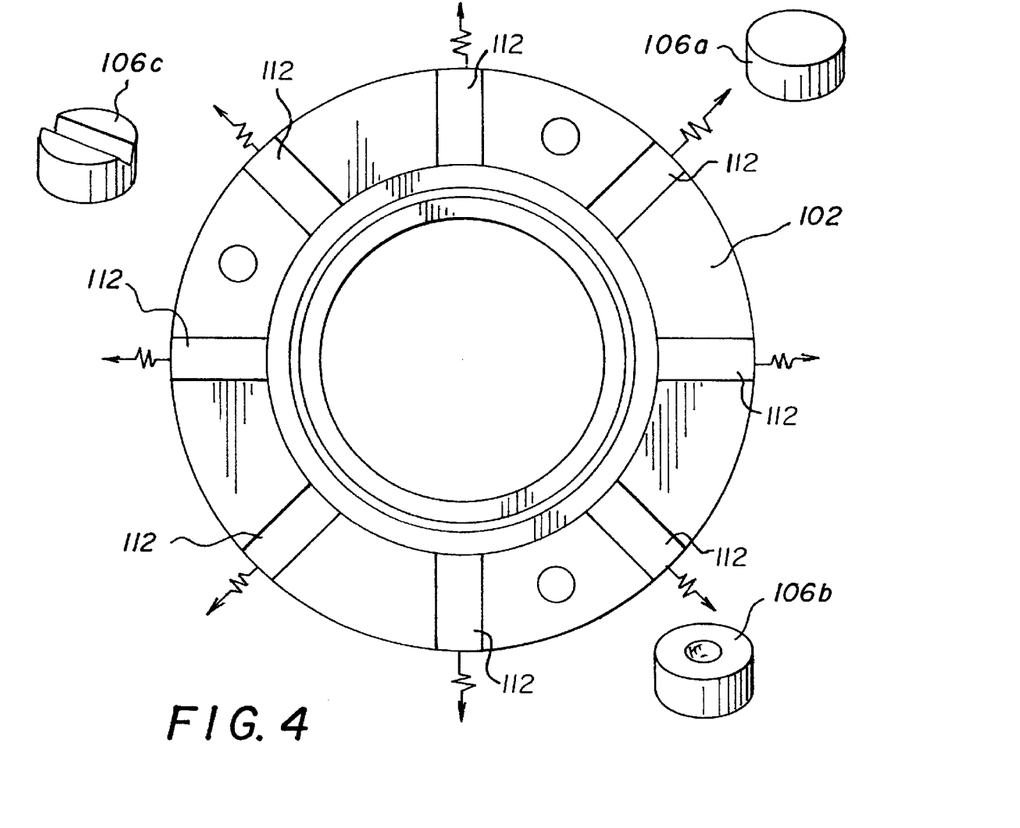
FIG. 4 is a top view of the bottom section of the measurement cell.

Although the preferred embodiment of the present invention is described as an interferometer operating in an autocorrelation configuration, it is noted that alternative optical configurations such as a standard Michelson configuration in which the sample is placed at one of the arms of the interferometer, as described in FIG. 4 of U.S. Pat. No. 5,596,409, can be utilized. It should also be noted that the present invention can be employed without use of the coherent light interferometer by using an alternative method for determining distance traveled by the low coherent light, for example by use of an optical encoder on a moving element.

The method of the present invention is employed to simultaneously generate front and back surface profiles together with group index of refraction and thickness profiles of samples of materials such as films utilizing low-coherent light interferometry. The method involves placing the sample in the measurement cell 14 between a thick, optically flat glass plate and a reflective or partially reflective surface, such as a second thick optically flat glass plate. The sample is offset from these plates using spacers which maintain a specific relative distance relationship between the surface of the sample and the surfaces of the plates.

Figure 2:
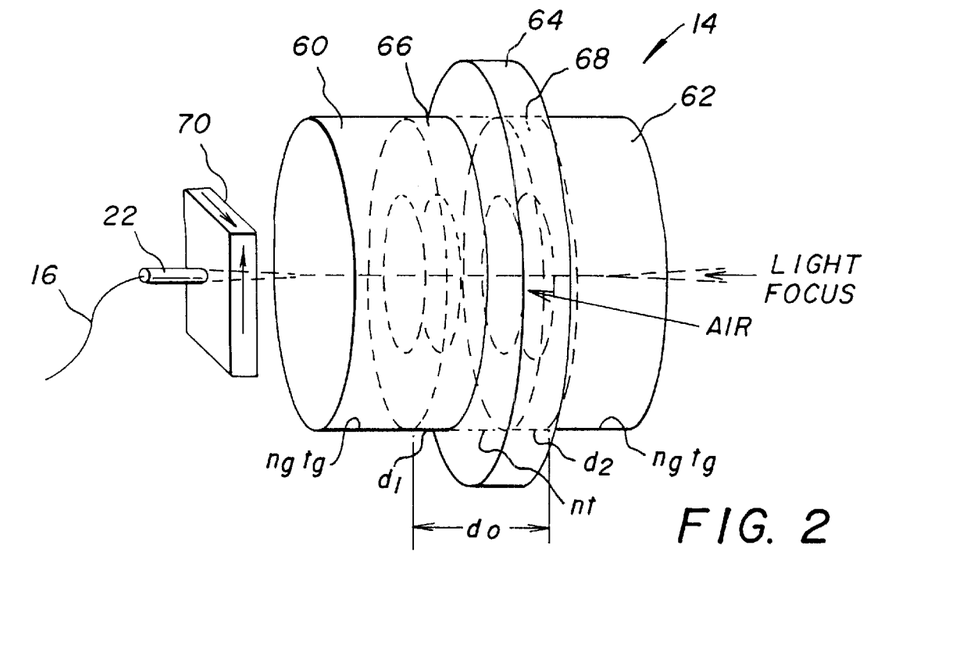
FIG. 2 is a schematic diagram illustrating the measurement cell employed with the present invention.

A schematic diagram of the measurement cell 14 is shown in FIG. 2. As shown in FIG. 2, the measurement cell 14 includes a pair of thick optical flats 60 and 62. Alternatively, any reflective surface, such as a plane mirror could be substituted for the optical flat 62. The sample 64 to be measured is located between the optical flats by spacers 66 and 68. The optical focusing probe 22 is mounted adjacent the optical flat 60 on an X-Y translation stage 70.

The optical thickness $n_g g_r$ of either of the glass flats 60, 62 must be greater than the distance $d_o$ between the two optical flats. Spacers 66 and 68 located around the perimeter of a measurement region in the measurement cell 14 are employed to adjust the air gaps $d_1$ and $d_2$ such that a known relationship holds between the two air gaps $d_1$ and $d_2$ and the optical thickness (nt) of the sample 64. An example of an acceptable distance relationship is shown in the following inequality:

$$nt<d_1<d_2<nt+d_1 \qquad (1)$$

where n is the group index of refraction of the film and t is the film thickness. As noted above, light from the optical focusing probe 22 is introduced into the measurement cell 14 and the probe 22 is mounted on an X-Y stage 70 to scan over the surface of the sample 64 in the measurement cell 14.

Figure 3:
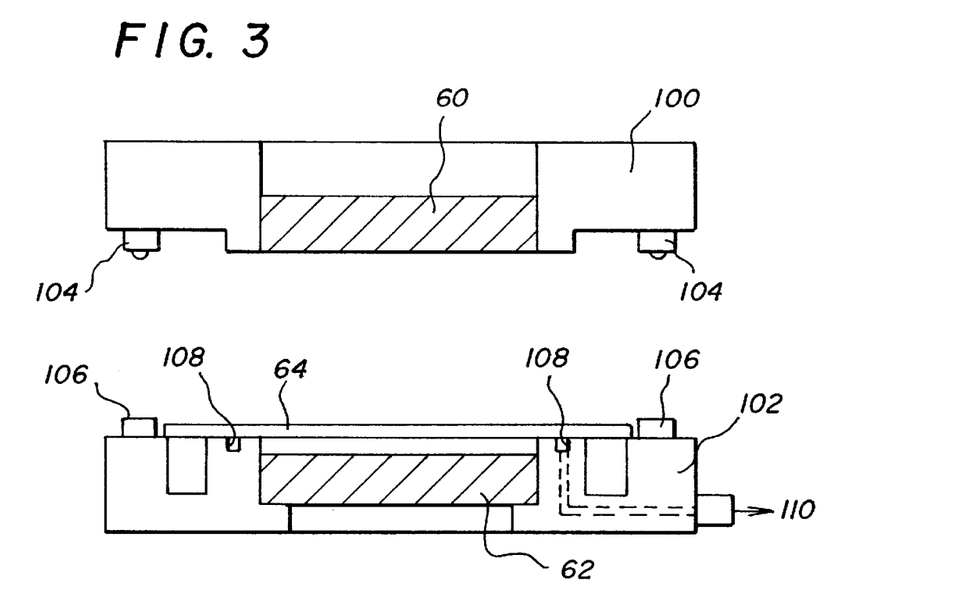
FIG. 3 is a cross sectional view of the measurement cell.

Referring to FIG. 3, a cross sectional view of a measurement cell is shown. The measurement cell includes a top portion 100 for holding glass plate 60 and a bottom portion 102 for holding glass plate 62. The top and bottom portions are provided with alignment features 104 and 106 respectively for allowing the top portion to be removed and replaced without affecting alignment. The bottom portion 102 is provided with a vacuum ring 108 connected to a vacuum supply 110 for holding down the sample. Referring to FIG. 4, the bottom portion 102, is provided with a plurality of spring loaded sample holders 112. The Sample 64 is attached, for example by gluing to the sample holders 112 and held in tension for a period of time sufficient to allow the sample to relax. The vacuum is then turned on to clamp the sample 64 in place. The top portion is then placed over the sample and aligned by cooperation between alignment features 104 and 106. The alignment features 104 comprise ball bearings set in cone shaped sockets. The alignment features 106 comprise a flat surface 106a, a cone shaped socket 106b, and a v-shaped groove 106c. The longitudinal axis of the v-groove passes through the center of the cone shaped socket 106b. An additional alignment feature comprising a pair of pins (not shown) in one of the sections loosely received in holes in the other section insures that the measurement cell can be assembled in only one orientation.

During measurement the interferometer interrogation depth, determined by the rotation of platform 36, is scanned a distance sufficient to measure nt, $d_1$ and $d_2$. The X-Y stage 70 is scanned over the sample surface portion of interest and the surface maps of the top and bottom surfaces follow the distance deviations of $d_1$ and $d_2$ respectively. The sample thickness and group index of refraction are calculated using an independent measurement of the distance between the optical flats, which are measured without the sample present in the measurement cell. Profiles are generated by measuring the sample properties at a plurality of locations over the surface of the sample and plotting the resulting measurements.

Figure 5:
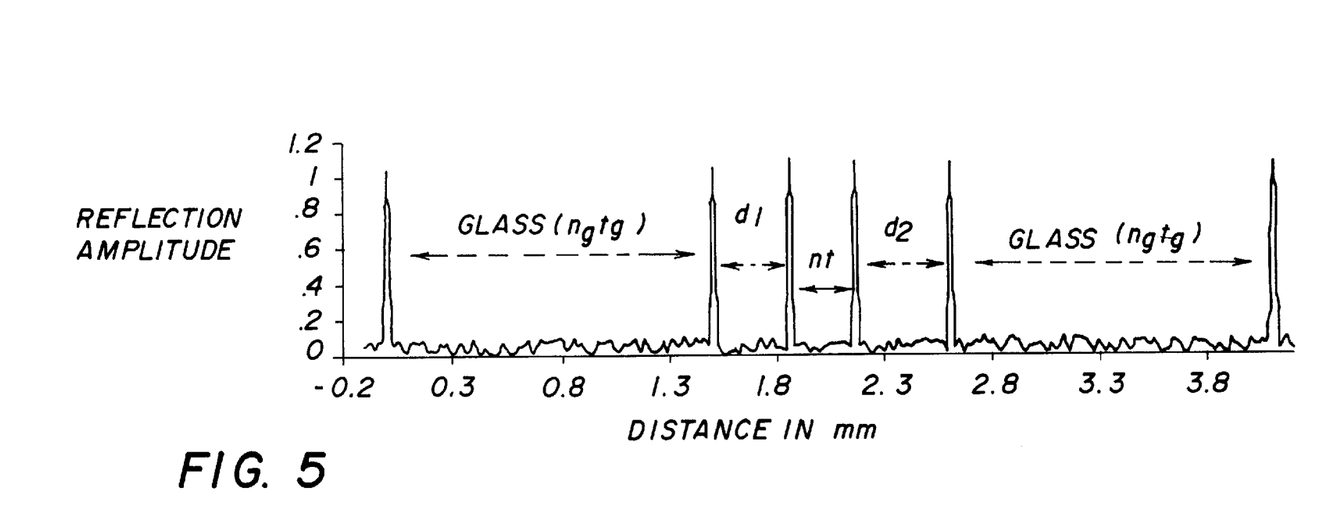
FIG. 5 is a plot showing reflection peaks from the surfaces in the measurement cell.

The measurement principle is as follows: Light from the LED 12 is input to measurement cell 14 via fiber optic light guide 16 and focussing lens 24 mounted on X-Y stage 70. The focusing lens 24 is provided with antireflective coatings so that no reflected light from the lens elements travels back along the fiber 16. Some light is reflected back from each of the optical interfaces in the measurement cell 14. These reflections occur at the front and back of the first optical flat 60, the front and back of the sample 64 and at the front and back of the second optical flat 62. FIG. 5 is a plot of reflection amplitude peaks showing the distances in mm between the reflection surfaces in the measurement cell 14.

Without the sample present the measured distance between the two flat plates is $d_o$. This is measured at each of the x and y measurement locations to define an array $d_o(x,y)$. The thickness profile of the film is given by the relationship $$t(x,y)=d_o(x,y)-d_1(x,y)-d_2(x,y). \quad (2)$$

The group index of refraction profile is given by $$n(x, y) = \frac{[nt](x, y)}{t(x, y)}. \quad (3)$$

Figure 6:
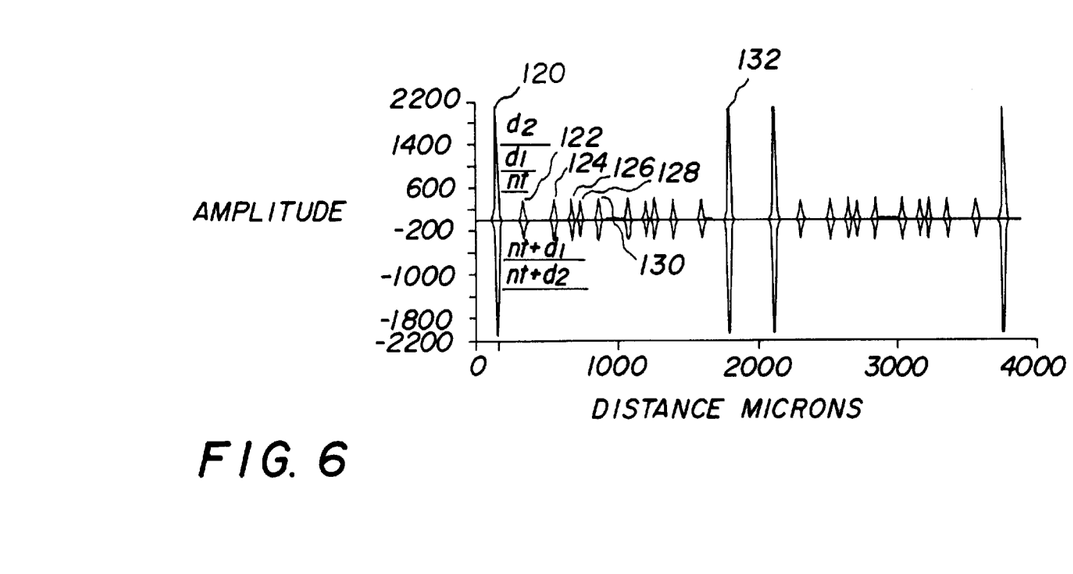
FIG. 6 is an example of a repetitive interferogram obtained by the method of the present invention.

The interferometer system introduces the sample reflections at the input of the interferometer. This is called the autocorrelation configuration. According to a preferred embodiment, the apparatus scans the interferometer path length continuously at 10 Hz providing 20 measurements per second. FIG. 6 shows an example of a repetitive interferogram for the measurement of a web material at a single location. The large peak 120 at the far left of FIG. 6 is a zero crossing point in the interferometer. The distance between the large zero crossing peak and the second peak 122 is nt (based on the rule of equation 1). The distance between the large zero crossing peak 120 and the third and fourth peaks 124 and 126 are $d_1$ and $d_2$ respectively. The distance between the large zero crossing peak 120 and the fifth and sixth peaks 128 and 130 are $d_1+nt$ and $d_2+nt$ respectively. After the sixth peak 130 the interferometer scan direction is reversed. The $7^{th}$ through $12^{th}$ peaks are then a mirror image of $1^{st}-6^{th}$ peaks. After the interferometer passes the zero crossing location again (large peak 132) the motor direction and hence the scanning direction of the interferometer is again changed. The $13^{th}-18^{th}$ peaks now corresponds to $1^{st}-6^{th}$ peaks followed by the $19^{th}-24^{th}$ peaks being mirror images of the first 6 peaks again. This process is repeated throughout the complete measurement cycle.

The peak locations are calculated using any of a variety of peak location analysis algorithms known in the art. As an example see U.S. Pat. No. 5,596,409 issued Jan. 21, 1997 to Marcus et al.

Figure 7:
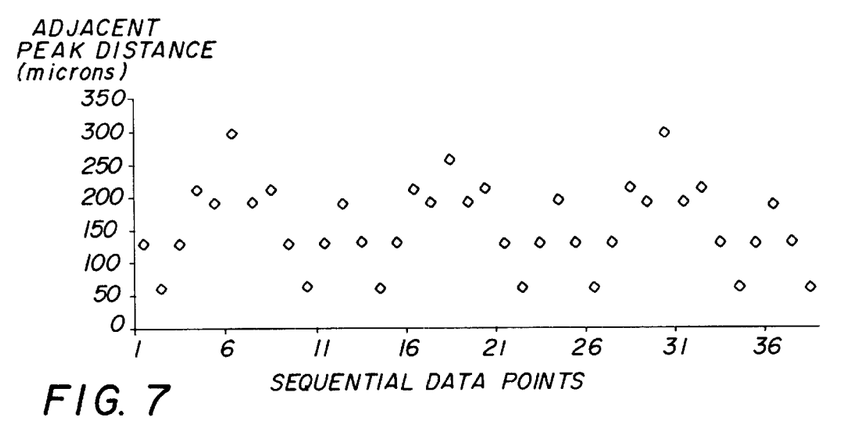
FIG. 7 is an illustration showing calculated adjacent peak distances in an interferogram.

FIG. 7 is a plot of the calculated adjacent distances between all peaks measured during $\frac{1}{10}$ second of data collection at the same location on the web. The $d_o$ distance for this measurement was 1062.586 microns. Calculated values for t, n $d_1$ and $d_2$, calculated by analyzing the peaks shown in FIG. 6, along with their repeat statistics for 20 measurements over 1 second are shown in Table 1.

TABLE 1

|  | nt | D1 | D2 | T | n |
|---|---|---|---|---|---|
| Average | 191.10 | 402.68 | 531.99 | 127.91 | 1.4940 |
| Sigma | .018 | .016 | .017 | .022 | .0003 |
| range | .06 | .06 | .06 | .06 | .0010 |

The longest adjacent distance peaks in FIG. 7 between 260–300 µm are the distances between adjacent 0 crossings of the interferometer. These occur at $6^{th}$, $18^{th}$ and $30^{th}$ peaks in FIG. 7. These are the reference peaks for calculating nt, $d_1$ and $d_2$. The distances between the reference peaks and the first sets of adjacent peaks, 5–6, 6–7, 18–19, 19–20, 29–30, and 30–31 are all measurements of nt. The distances between the reference peaks and the second sets of adjacent peaks 4–6, 6–8, 17–19, 19–21, 28–30 and 30–32 are all measurements of $d_1$. The distances between the reference peaks and the third adjacent peaks 3–6, 6–9, 15–18, 18–21, 27–30, 30–33 are all measurements of $d_2$. As long as the sequence of peaks remains constant the simultaneous measurement of n and t is able to be performed.

In order to perform a surface profile combined with n and t, the measurement position on the surface of the sample is moved in small increments after each scan is performed. Either a step and repeat procedure or a continuous scanning approach is possible. The lens system in the presently preferred embodiment has about a 50 µm focal spot diameter. If the scanning frame were moved at 1"/min then the motion per measurement point operating at a 20 Hz measurement rate would be 21.2 µm. To map the $2^{nd}$ axis at the same point density would require 1200 scans. If the sample is scanned at 5"/min a measurement density of 105.8 µm is achieved requiring 240 scans of duration 12 seconds each or 48 minutes for a 1" square profile.

Figure 8A:
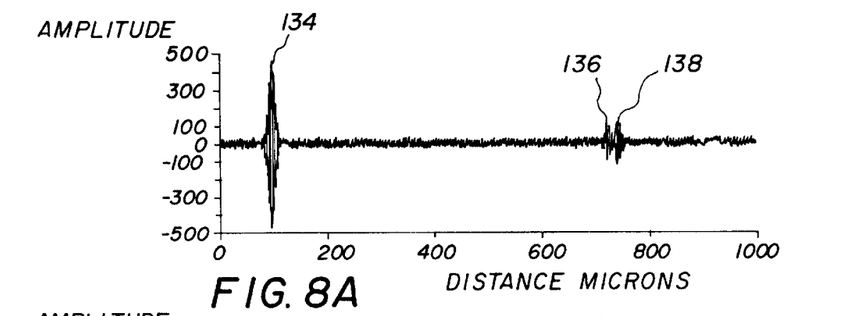
FIG. 8 shows an interferogram resulting from the measurement of a machine direction oriented polyester film with a retardation of about 20 $\mu$m using the apparatus shown in FIG. 1.
Figure 8B:
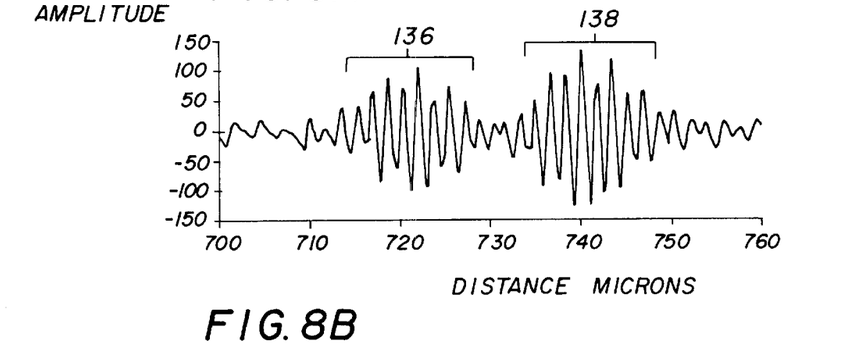

FIG. 8 shows an interferogram resulting from the measurement of a machine direction oriented polyester film with a retardation of about 20 µm using the apparatus shown in FIG. 1 with the film located at the position of measurement cell 14. The top trace in FIG. 8 shows the zero crossing interference peak 134 together with 2 adjacent thickness peaks 136 and 138 occurring at distances of $n_1t$ and $n_2t$ respectively. The optical retardation R is defined as $$R=n_2t-n_1t=(\Delta n)t \quad (4)$$

where $n_2$ and $n_1$ are the 2 indices of refraction in the xy plane of the film. The retardation is calculated from the difference in spacing between the second and third interferogram peaks as shown in the bottom trace of FIG. 8. One advantage of this technique is that no polarization optics are required to make a direct measurement of the retardation.

Figure 9:
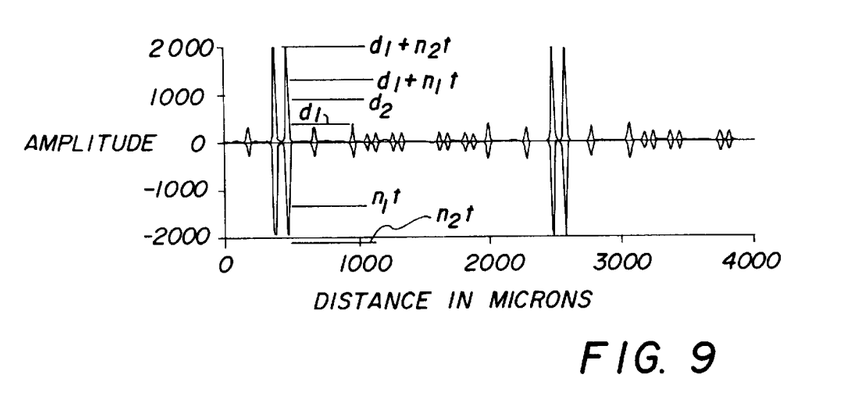
FIG. 9 is an interferogram showing the combined retardation, birefringence and thickness measurements for a Polyethylene Napthalate (PEN) web material obtained using the cell design of FIG. 2.

In order to calculate the birefringence ($\Delta n$) we need to measure the thickness of the film independently. This can be done by inserting the film in the measurement cell 14 of FIG. 2 and measuring the thickness with the interferometer. FIG. 9 is an interferogram showing the combined retardation, birefringence and thickness measurements for a Polyethylene Napthalate (PEN) web material obtained using the cell design of FIG. 2. In order for a successful measurement to be made the various spacings between adjacent sets of peaks have to satisfy a known set of relationships. The traces in FIG. 9 satisfy the relationships $$d_1 < d_2 < n_1 t < n_2 t < d_1 + n_1 t < d_1 + n_2 t < d_2 + n_1 t \quad (5).$$

The large amplitude peaks in FIG. 9 (magnitude about 2000) define the zero crossing positions in the interferometer. These are peaks $2^{nd}$, $3^{rd}$, $16^{th}$ and $17^{th}$ peaks, respectively. The interferometer scanning direction changes direction between the sets of peaks 2–3, 9–10, 16–17 and 23–24 in the interferogram shown in FIG. 9. The interferometer was set up to scan at 10 cycles per second or a 20 Hz measurement rate.

Figure 10:
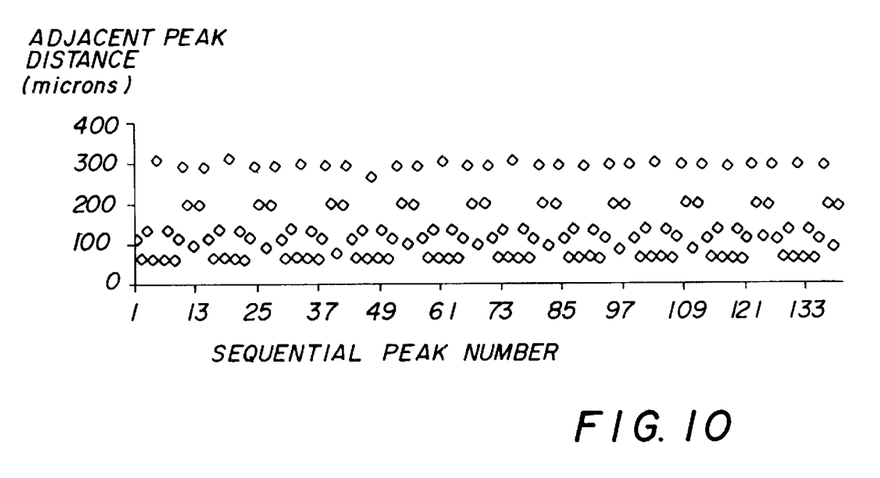
FIG. 10 shows data for all adjacent peaks for a 1 second measurement interval corresponding to the interferogram of FIG. 9.

FIG. 10 shows data for all adjacent peaks for a 1 second measurement interval corresponding to the interferogram of FIG. 9. The distance between the 0 crossing peaks are about 80–100 μm.

Referring to FIG. 10, the adjacent peak #s corresponding to the zero crossing peaks are located at peak #s 12, 26, 40, 54, 68, 82, 96, 110, 124 and 138 respectively. The front gap $d_1$ is calculated from the distances between sets of peaks 11–12, 12–13, 25–26, 26–27, 39–40, 40–41, 53–54, 54–55, 67–68, 68–69, 81–82, 82–83, 95–96, 96–97, 109–110, 110–111, 123–124, 124–125, 137–138 and 138–139. The measured values and the statistics for the measurement are shown in Table 2.

TABLE 2

|  | d1 | d2 | $n_1 t$ | $n_2 t$ | R | t | n1 | n2 |
|---|---|---|---|---|---|---|---|---|
| average | 197.31 | 490.50 | 603.01 | 667.04 | 64.03 | 374.27 | 1.6112 | 1.7822 |
| sigma | .022 | .019 | .021 | .020 | .022 | .020 | .00006 | .00005 |
| range | .079 | .069 | .101 | .086 | .095 | .085 | .00042 | .00040 |

The back gap $d_2$ is calculated from the distances between sets of peaks 10–12, 12–14, 24–26, 26–28, 38–40, 40–42, 52–54, 54–56, 66–68, 68–70, 80–82, 94–96, 96–98, 108–110, 110–112, 122–124 and 136–138. The measurement of the distance $n_1 t$ is calculated from the distances between sets of peaks 9–12, 12–15, 23–26, 26–29, 37–40, 40–43, 51–54, 54–57, 65–68, 68–71, 79–82, 82–85, 93–96, 96–99, 107–110, 110–113, 121–124, 124–127 and 135–138. The measurement of the distance $n_2 t$ is calculated from the distances between sets of peaks 8–12, 12–16, 22–26, 26–30, 36–40, 40–44, 50–54, 54–58, 64–68, 68–72, 78–82, 82–86, 92–96, 96–100, 106–110, 110–114, 120–124, 124–128 and 134–138. The retardation R can be calculated from the difference between $n_2 t$ and $n_1 t$, or it can be directly measured from the distances between adjacent peak data at peak locations 2, 8, 16, 22, 30, 36, 44, 50, 58, 64, 72, 78, 86, 92, 100, 106, 114, 120, 128 and 134. Retardation can also be directly measured from adjacent peak distance data at peak locations 4, 6, 18, 20, 32, 34, 46, 48, 60, 62, 74, 76, 88, 90, 102, 104, 116, 118, 130 and 132 in FIG. 10. The air gap distance $d_o$ without the sample being present was measured as 1062.10 μm for the retardation data measurement. The thickness of the film was calculated using equation 2. The birefringence at 1300 nm was calculated using equation 4 to be 0.1711.

It should be pointed out that to practice the present invention, the second optical flat plate does not require two surfaces. Any flat partially reflective surface is acceptable such as a polished metal surface. The only requirement is that the back reflective surface is parallel within the numerical aperture of the optical probe 14 to the front optically flat transparent plate.

In some situations the second plate is not necessary to obtain the thickness and top and bottom surface profiles simultaneously. This occurs in the case of constant group index of refraction materials. The group index of refraction can be measured once with both plates present or by external means. Once the group index of refraction is known and can be assumed to be constant and equal to n' then the present invention can be practiced with only one of the two reflective reference surfaces being present. In this case we measure d1 and (nt) and calculate t=(nt)/n' and d2=d1+t or measure d2 and nt and calculate t=nt/n' and d1=d2+t.

Figure 11:
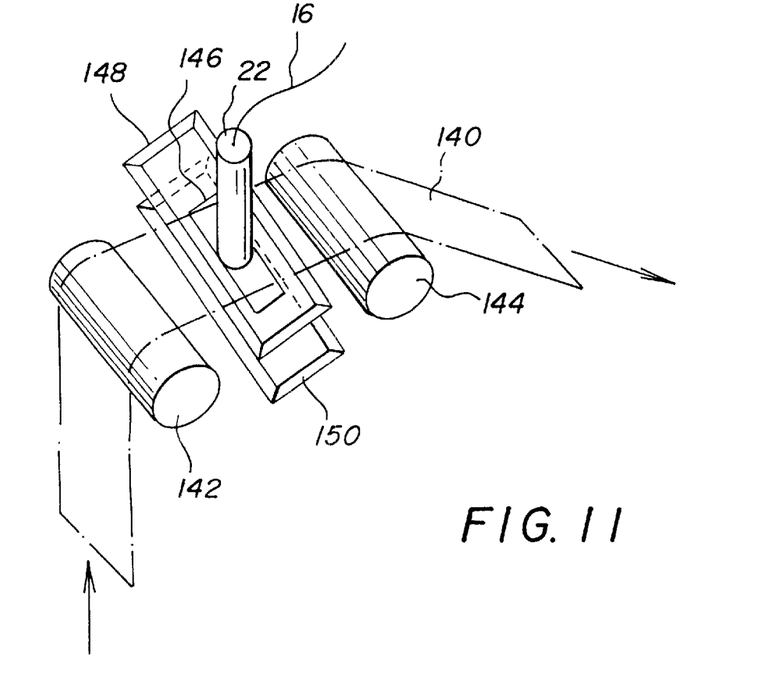
FIG. 11 is a schematic view of an optical probe useful for measuring a moving web.

A version of an optical probe 22 for use with the measurement system according to the present invention for measuring moving webs is shown in FIG. 11. The web 140 is shown going from the bottom left upward to a first turning roller 142 into the measurement zone, through a second tensioning roller 144. The measurement zone includes an optical probe 22 mounted on a one dimensional transport stage 146 capable of traversing the complete width of the web 140. A top transparent flat plate 148 is interposed between the optical probe and the web so that the distance from the top of the web to the surface of the plate 148 facing the web defines the distance $d_1$. The plate 148 is thick enough so that its optical path is larger than the physical distance between the top plate and a bottom optically reflective surface 150. The distance between the bottom reflective surface 150 and the bottom surface of the web 140 defines the distance $d_2$. The transparent top plate 148 and the bottom reflective surface 150 are mounted together and parallel so that the distance between them ($d_o$) remains constant. This apparatus is capable of making all of the types of measurements described above.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST | |
|---|---|
| 10 | low coherent light interferometer |
| 12 | light emitting diode |
| 14 | measurement cell |
| 15 | fiber optic light guide |
| 16 | fiber optic light guide |
| 17 | optical coupler |
| 18 | laser |
| 20 | optical head |
| 22 | optical focusing probe |

-continued

PARTS LIST

| | |
|---|---|
| 24 | gradient index lens |
| 26 | top beam |
| 28 | beam splitter cube |
| 30 | bottom beam |
| 32 | cube retroreflector |
| 34 | cube retroreflector |
| 36 | rotatable platform |
| 38 | rotating shaft |
| 40 | motor drive |
| 41 | output beam |
| 42 | power supply |
| 43 | output beam |
| 44 | laser light detector |
| 46 | low-coherent light detector |
| 48 | second notch filter |
| 50 | first notch filter |
| 52 | computer |
| 54 | signal processing electronics |
| 60 | first optical flat |
| 62 | second optical flat |
| 64 | sample |
| 66 | spacer |
| 68 | spacer |
| 70 | X-Y translation stage |
| 100 | top of measurement cell |
| 102 | bottom of measurement cell |
| 104 | alignment feature |
| 106 | alignment feature |
| 106a | flat alignment feature |
| 106b | cone shaped socket feature |
| 106c | v-shaped groove feature |
| 108 | vacuum ring |
| 110 | vacuum supply |
| 112 | sample holders |
| 120 | large peak |
| 122 | second peak |
| 124 | third peak |
| 126 | fourth peak |
| 128 | fifth peak |
| 130 | sixth peak |
| 132 | large peak |
| 134 | zero crossing interference peak |
| 136 | thickness peak |
| 138 | thickness peak |
| 140 | web |
| 142 | turning roller |
| 144 | tensioning roller |
| 146 | transport stage |
| 148 | top transparent plate |
| 150 | bottom optically reflective surface |

What is claimed is:

1. A method of simultaneously measuring the thickness, group index of refraction, and top and bottom surface profiles of a sample, comprising the steps of:

a) locating the sample between a surface of a transparent optical flat and a parallel reflective surface such that the respective optical distances between any two of the surface of the optical flat, the top surface of the sample, the bottom surface of the sample, and the reflective surface are distinct and in a known relative optical distance relationship, the distance between the surface of the transparent optical flat and the parallel reflective surface being known;

b) employing low-coherent light interferometry to measure the distance between the optical flat surface and the top surface of the sample, the optical thickness of the sample, and the distance between the bottom surface of the sample and the reflective surface at a plurality of locations over the sample, employing the known relative optical distance relationships;

c) generating top and bottom surface profiles and a thickness profile of the sample from the measured distances and the known distance between the surface of the transparent optical flat and the parallel reflective surface; and d) calculating a group index of refraction profile from the measured optical thickness of the sample and the thickness profile of the sample.

2. The method claimed in claim 1, wherein the distance measuring step includes employing coherent light interferometry to define a metric for the measured distances.

3. The method claimed in claim 1, wherein the plurality of measurement locations are arranged in a two dimensional patterns of rows and columns.

4. The method claimed in claim 1, wherein the low coherent light interferometry is in an autocorrelation configuration.

5. The method claimed in claim 1, wherein the group index of refraction profile is generated from the measured optical thickness profile and the generated thickness profile.

6. The method of claim 1, wherein the sample is a birefringent material and the method further includes the step of measuring the optical retardation or birefringence profile of the material.

7. Apparatus for simultaneously measuring the thickness, group index of refraction, and top and bottom surface profiles of a sample, comprising:

a) a transparent optical flat:

b) a reflective surface located a known distance from and parallel to the transparent optical flat;

c) spacers for locating the sample between the transparent optical flat and the reflective surface such that the respective optical distances between any two of the surface of the optical flat, the top surface of the sample, the bottom surface of the sample, and the reflective surface are distinct and in a known relative optical distance relationship;

d) a low-coherent light interferometer operating in an autocorrelation configuration located with respect to the transparent optical flat for producing signals representing the distance between the optical flat surface and the top surface of the sample, the optical thickness of the sample, and the distance between the bottom surface of the sample and the reflective surface, the interferometer including a probe and a translation stage for moving the probe relative to the transparent optical flat for producing signals representing the measured distances at a plurality of locations over the sample;

e) a computer responsive to the signals for generating top and bottom surface profiles and a thickness profile of the sample from the known distance between the surface of the transparent optical flat and the parallel reflective surface and the measured distances between the optical flat surface and the top surface of the sample and the measured distances between the bottom surface of the sample and the reflective surface and for calculating an group index of refraction profile from the measured optical thickness of the sample and the thickness profile of the sample.

8. The apparatus claimed in claim 7, wherein the translation stage is a linear translation stage for measuring a moving web.

9. The apparatus claimed in claim 7, wherein the translation stage is a 2 dimensional translation stage.

10. A method of simultaneously measuring the thickness, and top and bottom surface profiles of a sample of constant group index of refraction, comprising the steps of:

a) locating the sample near a surface of a transparent optical flat or parallel reflective surface such that the respective optical distances between the surface of the optical flat or parallel reflective surface and the adjacent surface of the sample and the optical path between the top and bottom surfaces of the sample are distinct and in a known relative optical distance relationship;

b) employing low-coherent light interferometry to measure the distance between the optical flat surface or parallel reflective surface and the adjacent surface of the sample and the optical thickness of the sample at a plurality of locations over the sample, employing the known relative optical distance relationships; and c) generating top and bottom surface profile and a thickness profile of the sample from the measured distances and the known group index of refraction.

* * * * *